United States Patent
Cicala et al.

(10) Patent No.: US 8,042,325 B2
(45) Date of Patent: Oct. 25, 2011

(54) ADAPTING INDICATED ENGINE TORQUE DURING REGENERATION OF A DIESEL PARTICULATE FILTER

(75) Inventors: Stephen M. Cicala, Dearborn Heights, MI (US); Cristina Ike, Ferndale, MI (US); Charles W. Suter, South Lyon, MI (US); Joseph Kucharski, Livonia, MI (US); Bradley D. Riedle, Northville, MI (US); Dave M. Dillon, Dearborn Heights, MI (US); Michael Polk, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1027 days.

(21) Appl. No.: 11/933,598

(22) Filed: Nov. 1, 2007

(65) Prior Publication Data
US 2009/0118993 A1 May 7, 2009

(51) Int. Cl.
*F01N 3/00* (2006.01)
(52) U.S. Cl. ........ 60/285; 60/274; 60/295; 60/297; 60/311
(58) Field of Classification Search .......... 60/274, 60/285, 295, 297, 311
See application file for complete search history.

(56) References Cited

U.S. PATENT DOCUMENTS

| | | | |
|---|---|---|---|
| 5,327,992 A * | 7/1994 | Boll | 180/65.25 |
| 5,855,533 A * | 1/1999 | Tolkacz et al. | 477/110 |
| 6,035,252 A | 3/2000 | Dixon et al. | |
| 6,716,136 B2 * | 4/2004 | Hrovat et al. | 701/54 |
| 6,738,702 B2 * | 5/2004 | Kolmanovsky et al. | 701/54 |
| 6,840,887 B2 | 1/2005 | Hrovat et al. | |
| 6,971,970 B2 | 12/2005 | Inoue et al. | |
| 6,976,388 B2 | 12/2005 | Heap et al. | |
| 2004/0044457 A1 | 3/2004 | Kolmanovsky et al. | |

FOREIGN PATENT DOCUMENTS

| | | |
|---|---|---|
| EP | 1467079 A2 | 10/2004 |
| JP | 2005120887 | 5/2005 |

* cited by examiner

*Primary Examiner* — Tu M. Nguyen
*Assistant Examiner* — Diem Tran
(74) *Attorney, Agent, or Firm* — David B. Kelley; MacMillan, Sobanski & Todd, LLC

(57) ABSTRACT

In a motor vehicle powertrain that includes a diesel engine, a particulate filter and a torque converter, a method for correcting an indicated engine output torque includes estimating a magnitude of torque being transmitted from the engine to the torque converter while regenerating the particulate filter, determining a reference magnitude of current engine torque being produced while regenerating the particulate filter, determining a torque error from a difference between the estimated magnitude and the reference magnitude, recording the torque error, determining a current torque error from the recorded torque error using a current engine speed and a current reference engine torque as indices to the recorded engine toque error, producing a corrected engine torque from the sum of the current torque error and the current reference engine torque, and using the corrected engine torque to control operation of the transmission.

8 Claims, 1 Drawing Sheet

ADAPTING INDICATED ENGINE TORQUE DURING REGENERATION OF A DIESEL PARTICULATE FILTER

BACKGROUND OF THE INVENTION

1. Field of the Invention

This invention relates generally to motor vehicle powertrain control, and, in particular, to correcting indicated engine output torque for use in transmission control.

2. Description of the Prior Art

Vehicle manufacturers use diesel emission treatment equipment in order to comply with more stringent diesel emissions control requirements. For example, diesel particulate filters (DPF) are now used to comply with updated emissions standards. These filters are cleaned or regenerated periodically by raising the temperature of engine exhaust gas, which oxidizes the soot and ash in the filter as the exhaust gas flows through the DPF.

The DPF regeneration process occurs in three modes: Mode 0 is base, non-regenerative operation, mode 1 pre-heats the exhaust close to the required regenerative temperature, and in mode 2 the exhaust is hot enough for the regenerative cycle to terminate after the particulates in the DPF oxidize.

Each mode of the regenerative process has a unique engine torque map. Moving from one mode to another can cause large variations in engine output torque. These large variations present a problem with respect to control of an automatic transmission located in a vehicle powertrain with a diesel engine having a DPF. For example, a base (mode 0) engine mapping error of +5% at 500 ft-lb is a +25 ft-lb torque error. A mode 1 engine mapping error of −5% at 500 ft-lb is a −25 ft-lb torque error.

The transmission controls, which are calibrated to the base mapping error, might not handle a possible ±50 ft-lb difference in the torque error from base when the engine transitions in and out of the regenerative process. Additionally, the existing adaptive pressure control algorithms will hunt from poor to good shifts each time the regenerative process is entered and exited as the algorithms accommodate to the unique torque maps.

Though it is possible to reduce the torque error through better mapping, it is difficult, if not impossible, to completely eliminate when hardware variability is taken into account. For example, fuel injectors have part-to-part variability, including aging, and the base torque map may change over time. Normally, pressure control adaptive compensates for these effects. However, aging may have a completely different effect on the particulate filter regeneration torque map because the fueling pulses are not the same. Thus the traditional pressure control adaptive is unable to compensate for both modes of engine operation.

SUMMARY OF THE INVENTION

In a motor vehicle powertrain that includes a diesel engine, a particulate filter and a torque converter, a method for correcting an indicated engine output torque includes estimating a magnitude of torque being transmitted from the engine to the torque converter while regenerating the particulate filter, determining a reference magnitude of current engine torque being produced while regenerating the particulate filter, determining a torque error from a difference between the estimated magnitude and the reference magnitude, recording the torque error, determining a current torque error from the recorded torque error using a current engine speed and a current reference engine torque as indices to the recorded engine toque error, producing a corrected engine torque from the sum of the current torque error and the current reference engine torque, and using the corrected engine torque to control operation of the transmission.

An adaptive algorithm modifies the torque calculation provided by an engine controller while DPF regeneration is active. The algorithm learns quickly and learns non-shifting and is much faster than pressure control adaptive which learns per shift. The error adjustment is stored in keep alive memory (KAM), which allows the learned errors to be used in the future, i.e. during the next power-up.

The algorithm is immune to k-factor variability, aging, and hardware variances because it uses a delta from the base (non-regenerative) torque error. Torque error estimation is available when the torque converter is locked.

Results from use of the algorithm causes all functions of the transmission control system including torque management, pressure control and converter clutch control to operate in response to the corrected engine torque.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
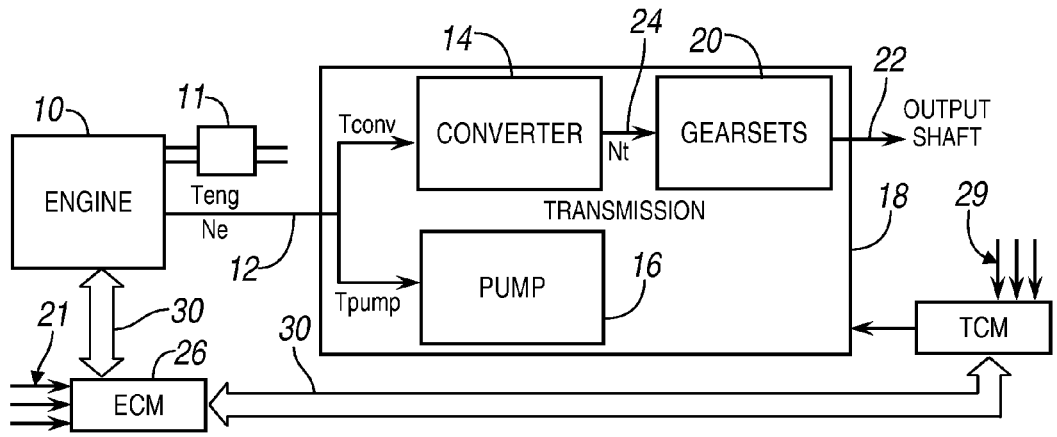
FIG. 1 is a schematic diagram showing a motor vehicle powertrain whose engine exhaust system includes a DPF.
Figure 2:
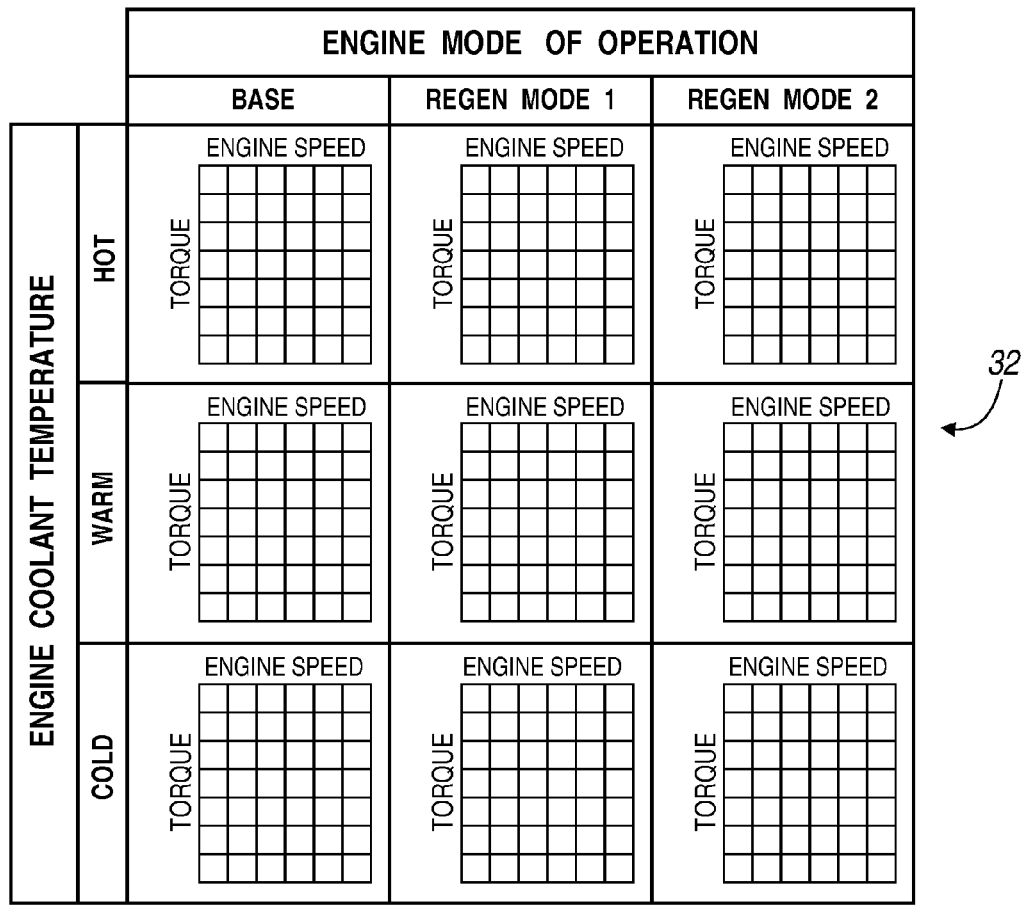
FIG. 2 is schematic diagram showing look-up tables containing torque errors indexed by regeneration mode and engine coolant temperature.

Referring to FIGS. 1 and 2, the powertrain of a motor vehicle includes a diesel engine 10, which produces output torque $T_{eng}$. The engine's exhaust system includes a diesel particulate filter (DPF) 11, through which engine exhaust gas flows to the atmosphere. A first portion $T_{conv}$ of the engine's output torque is transmitted by an engine crankshaft 12 to a torque converter 14, and a second portion $T_{pump}$ is transmitted to a hydraulic pump 16, which pressurizes the hydraulic system of an automatic transmission 18. Transmission 18 may contain gearsets 20, which are controlled to produce multiple step-change gear ratios, which are ratios of the speed of the transmission turbine shaft speed 24 $N_t$ and of the speed of the transmission output shaft 22. Alternatively, transmission 18 may produce continuously variable speed ratios. In either case, the transmission output 22 is driveably connected to driven wheels of the vehicle. The rotational speed of the transmission turbine shaft 24 is $N_t$.

Operation of the engine 10 is controlled by a engine control module (ECM) 26, which is an electronic controller that receives input signals 21 representing the magnitude of engine parameters including, but not limited to, the mass air flow rate into the engine, engine speed, fuel rate into the engine, engine coolant temperature, displacement of the accelerator pedal, throttle position, and the regeneration mode of the DPF 11.

Similarly, operation of the transmission 18 is controlled by a transmission control module (TCM) 28, which is an electronic controller that receives input signals 29 representing the magnitude of transmission parameters including, but not limited to the position of a gear selector, the current gear in which the transmission is operating or a desired gear, engine speed, turbine shaft speed $N_t$, output shaft speed, vehicle speed, transmission oil temperature, and line pressure.

The engine 10, transmission 18, ECM 26 and TCM 28 communicate over a communication area network (CAN) 30. The TCM 28 and ECM 26 communicate also with electronic memory, including ROM, which contains control algorithms, and keep-alive-memory (KAM) 32, whose contents are retained for future use after the vehicle's source of electric power is turned off.

An estimated engine output torque is calculated using the torque converter equation:

$$T_{conv} = \left(\frac{N_e}{K}\right)^2,$$

wherein K is a torque converter capacity factor, which is a function of speed of the transmission turbine shaft 24 $N_t$ and engine speed $N_e$, i.e., torque converter input speed. While the transmission is not shifting, the estimated engine torque is compared to the engine torque $T_{can}$ as determined by the ECM 26. The difference resulting from this comparison is a torque error ($T_{error}$), which is stored in KAM 32, in the form of a table indexed by engine torque $T_{can}$ determined by the ECM 26 and engine speed $N_e$. The torque error $T_{error}$ is determined for all modes of the DPF regenerative process when the conditions allow storing the torque error in KAM 32.

The systems of equations used to determine torque error includes:

$$I\alpha = T_{eng} - T_{conv} - T_{pump}$$

$$T_{conv} = T_{eng} - T_{pump} - I\alpha \quad \text{Eq (1)}$$

$$T_{conv} = \left(\frac{N_e}{K}\right)^2 \text{ where } K = f\left(\frac{N_t}{N_e}\right) \quad \text{Eq (2)}$$

$T_{eng} = T_{can} + T_{error}$ where $T_{can}$ is provided by the ECM via CAN (from torque mapping and excludes $I\alpha$)

Then from equations 1 and 2, the torque signal error may be estimated:

$$T_{conv} = T_{can} + T_{error} - T_{pump} - I\alpha$$

$$T_{error} = T_{conv} + T_{pump} I\alpha - T_{can}$$

The torsion inertia of the engine ($I\alpha$) is determined from the current rate of change of engine speed ($\alpha$) and the rotational inertia (I) of the engine, a constant. Pump torque $T_{pump}$ is determined from a function stored in a look-up table in electronic memory and indexed by relevant transmission parameters 29 including line pressure, engine speed and transmission oil temperature. The engine torque $T_{can}$ is determined by the ECM 26 from an engine map or function stored in electronic memory and indexed by relevant engine parameters 27.

The DPF regeneration process occurs in three modes: Mode 0 is a base or reference operation, in which regeneration of the DPF 11 does not occur. Therefore, torque errors $T_{error}$ for mode 0 are developed when no regeneration of the DPF 11 occurs. During Mode 1, the engine exhaust gas is preheated to a temperature that is close to the required regenerative temperature. During Mode 2, the temperature of the engine exhaust gas is high enough for the regenerative cycle to terminate after the particulates in the DPF 11 oxidize.

The torque errors $T_{error}$ are stored in nine KAM tables 32, one set of three torque errors for each of the three DPF regenerative modes. Each torque error $T_{error}$ set for each mode has a table, which corresponds with the three temperature regions of the engine 10, i.e., cold, warm and hot.

While the DPF 11 is being regenerated, the relevant Mode 1 and Mode 2 torque error is compared with the Mode 0 torque error for the current engine torque $T_{can}$ determined by the ECM 26 and the current engine speed $N_e$. ECM 26 repetitively transmits at frequent intervals the determined engine torque $T_{can}$ to TCM 28.

That comparison produces a regenerative-to-base torque error, which is added to the current engine torque $T_{can}$ determined by the ECM 26. The sum of the current engine torque $T_{can}$ that is determined by the ECM 26 and the regenerative-to-base torque error difference is used by the TCM 28 for hydraulic pressure control, torque management and converter clutch control.

Alternatively, the torque error need not be normalized with reference to the base or Mode 0 error. Instead, the torque error determined and stored in memory for the relevant Mode 1 and Mode 2, current engine coolant temperature, current engine speed and current engine torque determined by the ECM 26 is selected from KAM 32 used directly to correct the engine torque $T_{can}$ determined from the engine map by the ECM 26. Then, the corrected engine torque $T_{can}$ is used by the TCM 28 for hydraulic pressure control, torque management and converter clutch control.

In order for the calculated error to be written to KAM for use by the TCM 28 certain conditions must be met. None of the required systems of sensors may be in error mode.

The sensors that provide signals representing engine coolant temperature (ECT), transmission oil temperature (TOT), accelerator pedal position, and selected transmission range all must be in working order. The CAN network, engine torque calculator and torque converter clutch circuitry all must be in working order. The engine cannot be in computer controlled shutdown (CCSD).

The torque converter must be open and full of fluid. The torque converter equation is not valid for a closed torque converter. A partially filled converter can cause torque converter equation variance due to k-factor variance.

The transmission range sensor must be in a drive or manual gear range.

The speed ratio cannot be too high because at high speed ratios, especially those greater that 1.0, the k-factor tends to infinity and the torque converter equation is no longer valid.

The ECT and TOT must be within an acceptable range to ensure that learning is only occurring where the DPF 11 will regenerate, to ensure that learning is not occurring during heat protection, and to protect for inaccuracies to due to extremely cold transmission fluid.

The transmission must not be executing a gear ratio change to protect against transients.

The accelerator pedal position must be steady and non-zero for transient protection.

The engine torque must be steady and above a minimum value to allow the comparison.

The engine speed must be steady and traction control event cannot be in progress in order to protect against estimation errors due to transients.

Use of the torque error change makes the torque adjustment used by the transmission controller 29 robust against torque converter hardware tolerance variability, wear variability, and k-factor mapping inaccuracy.

In accordance with the provisions of the patent statutes, the preferred embodiment has been described. However, it should be noted that the alternate embodiments can be practiced otherwise than as specifically illustrated and described.

What is claimed is:

1. In a motor vehicle powertrain that includes a diesel engine, a particulate filter and a torque converter, a method for correcting an indicated engine output torque comprising the steps of:
    (a) using a engine speed and a torque converter constant to estimate a first magnitude of torque being transmitted from the engine to the torque converter while regenerating the particulate filter and a second magnitude of torque being transmitted from the engine to the torque converter while no regeneration of the particulate filter occurs;
    (b) using engine parameters to determine a first reference magnitude of current engine torque being produced while regenerating the particulate filter and a second reference magnitude of current engine torque being produced while no regeneration of the particulate filter occurs;
    (c) determining a first torque error from a difference between the first estimated magnitude and the first reference magnitude, and a second torque error from a difference between the second estimated magnitude and the second reference magnitude;
    (d) recording the first and second torque errors with reference to the engine speed, the reference magnitude, and the mode of regeneration at which the torque error is determined;
    (e) determining a differential torque error from the recorded first and second torque errors using a current engine speed, a current reference engine torque and a current mode of regeneration;
    (f) producing a corrected engine torque from a sum resulting from the current reference engine torque and the differential torque error; and
    (g) using the corrected engine torque to control operation of the transmission.

2. The method of claim 1 wherein:
    step (d) further comprises recording the torque error with reference to a engine coolant temperature at which the torque error is determined; and
    step (e) further comprises determining a differential torque error from the recorded torque errors using a current engine speed, a current reference engine torque, and a current an engine coolant temperature as indices to the recorded engine torque errors.

3. The method of claim 1 wherein the powertrain includes a transmission pump and step (a) further comprises using a engine speed, a torque converter constant, and a magnitude of torque being transmitted from the engine to the transmission pump to estimate a magnitude of torque being transmitted from the engine to the torque converter.

4. The method of claim 1 wherein the powertrain includes a transmission pump and step (a) further comprises using an engine speed, a torque converter constant, a magnitude of torque being transmitted from the engine to the transmission pump, and a magnitude of engine rotating inertia to estimate a magnitude of torque being transmitted from the engine to the torque converter.

5. A method for correcting indicated engine output torque, comprising:
    (a) using engine speed and a torque converter constant to estimate a first torque magnitude transmitted from a diesel engine to a torque converter while regenerating a particulate filter and a second torque magnitude of torque transmitted from a diesel engine to a torque converter while said regeneration does not occur;
    (b) using engine parameters to determine a first reference engine torque produced while regenerating said filter and a second reference engine torque produced while said regeneration does not occur;
    (c) determining a first torque error from a difference between the first estimated magnitude and the first reference magnitude, and a second torque error from a difference between the second estimated magnitude and the second reference magnitude;
    (d) recording the first and second torque errors with reference to the engine speed, the reference magnitude, and the mode of regeneration at which the torque error is determined;
    (e) determining a differential torque error from the recorded first and second torque errors using a current engine speed, a current reference engine torque and a current mode of regeneration;
    (f) producing a corrected engine torque from a sum of the current reference engine torque and the differential torque error; and
    (g) using the corrected engine torque to control operation of the transmission.

6. The method of claim 5 wherein:
    step (d) further comprises recording the torque error with reference to a engine coolant temperature at which the torque error is determined; and
    step (e) further comprises determining a differential torque error from the recorded torque errors using a current engine speed, a current reference engine torque, and a current an engine coolant temperature as indices to the recorded engine torque errors.

7. The method of claim 5 wherein the powertrain includes a transmission pump and step (a) further comprises using a engine speed, a torque converter constant, and a magnitude of torque being transmitted from the engine to the transmission pump to estimate a magnitude of torque being transmitted from the engine to the torque converter.

8. The method of claim 5 wherein the powertrain includes a transmission pump and step (a) further comprises using an engine speed, a torque converter constant, a magnitude of torque being transmitted from the engine to the transmission pump, and a magnitude of engine rotating inertia to estimate a magnitude of torque being transmitted from the engine to the torque converter.

* * * * *